US010467360B1

(12) United States Patent
Gupta et al.

(10) Patent No.: US 10,467,360 B1
(45) Date of Patent: Nov. 5, 2019

(54) SYSTEM AND METHOD FOR DYNAMICALLY DETERMINING AVAILABILITY OF A COMPUTING RESOURCE

(71) Applicant: FMR LLC, Boston, MA (US)

(72) Inventors: Deepak Gupta, Bangalore (IN); Rupesh Kumar Mishra, Bangalore (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/238,469

(22) Filed: Jan. 2, 2019

(51) Int. Cl.
*G06F 17/50* (2006.01)

(52) U.S. Cl.
CPC ...... *G06F 17/5009* (2013.01); *G06F 2217/16* (2013.01)

(58) Field of Classification Search
CPC .................. G06F 17/5009; G06F 2217/16
USPC ........................................... 703/2
See application file for complete search history.

(56) References Cited

U.S. PATENT DOCUMENTS

| 7,152,157 | B2 * | 12/2006 | Murphy | G06F 9/5077 713/100 |
| 7,782,869 | B1 * | 8/2010 | Chitlur Srinivasa | G06F 9/5011 370/230 |
| 8,255,915 | B1 * | 8/2012 | Blanding | G06F 9/5027 718/104 |
| 8,878,852 | B1 * | 11/2014 | Klein | H04L 43/0811 345/440 |
| 8,954,545 | B2 * | 2/2015 | Govil | G06F 9/455 709/220 |
| 9,210,048 | B1 * | 12/2015 | Marr | H04L 41/145 |
| 9,215,158 | B1 * | 12/2015 | Adogla | H04L 29/08144 |
| 9,288,148 | B1 * | 3/2016 | Krishnaswamy | H04L 41/0893 |
| 9,712,374 | B1 * | 7/2017 | Cao | H04L 29/08072 |
| 9,715,500 | B2 * | 7/2017 | Cue | G06Q 10/107 |

(Continued)

OTHER PUBLICATIONS

Torres et al. ("A hierarchical approach for availability and performance analysis of private cloud storage services", Computing (2018) 100:621-644 https://doi.org/10.1007/s00607-018-0588-7) (Year: 2018).*

(Continued)

*Primary Examiner* — Brian S Cook
*Assistant Examiner* — Iftekhar A Khan
(74) *Attorney, Agent, or Firm* — Proskauer Rose LLP (57) ABSTRACT

A method is described for dynamically determining availability of a computing resource. An application session is established, and an application session data matrix is generated including parameters specifying aspects of the application session, an application associated with the application session, and a computing resource on which the application session depends. A component signature block is derived based on the parameters of the application session data matrix. The component signature block identifies the computing resource on which the application session depends and a total number of sessions dependent on the computing resource. A metric signature block is generated based on one or more parameters of the application session data matrix and the component signature block. The metric signature block is classified according to one or more probability models. A computing resource availability rating for the computing resource is derived based on an output of the one or more probability models.

20 Claims, 4 Drawing Sheets

(56) References Cited

U.S. PATENT DOCUMENTS

| | | | | |
|---|---|---|---|---|
| 10,019,822 | B2* | 7/2018 | Klein | H04L 43/0811 |
| 10,061,864 | B1* | 8/2018 | Xu | G06F 16/9024 |
| 10,305,758 | B1* | 5/2019 | Bhide | H04L 41/22 |
| 2004/0054690 | A1* | 3/2004 | Hillerbrand | G06Q 10/06 |
| 2006/0178858 | A1* | 8/2006 | Trowbridge | G06F 8/34 |
| | | | | 703/2 |
| 2007/0169103 | A1* | 7/2007 | Bhatkhande | G06F 8/71 |
| | | | | 717/170 |
| 2011/0060832 | A1* | 3/2011 | Govil | G06F 9/5044 |
| | | | | 709/225 |
| 2011/0184963 | A1* | 7/2011 | Singh Thakur | H04L 29/06068 |
| | | | | 707/755 |
| 2011/0219118 | A1* | 9/2011 | Cowan | G06F 11/3409 |
| | | | | 709/224 |
| 2011/0320391 | A1* | 12/2011 | Chen | G06F 11/3452 |
| | | | | 706/14 |
| 2012/0017114 | A1* | 1/2012 | Timashev | G06F 11/1469 |
| | | | | 714/15 |
| 2012/0084386 | A1* | 4/2012 | Fu | G06F 9/5072 |
| | | | | 709/214 |
| 2013/0080641 | A1* | 3/2013 | Lui | H04L 67/10 |
| | | | | 709/226 |
| 2014/0215259 | A1* | 7/2014 | Crabtree, Jr. | G06F 11/202 |
| | | | | 714/4.11 |
| 2015/0007197 | A1* | 1/2015 | Tripp | G06F 9/46 |
| | | | | 718/106 |
| 2015/0096011 | A1* | 4/2015 | Watt | H04L 63/0272 |
| | | | | 726/15 |
| 2015/0195157 | A1* | 7/2015 | Nayyar | H04L 43/0852 |
| | | | | 709/224 |
| 2015/0221109 | A1* | 8/2015 | Klein | H04L 43/0811 |
| | | | | 345/440 |
| 2016/0081134 | A1* | 3/2016 | Chow | G06Q 30/0263 |
| | | | | 455/419 |
| 2016/0094477 | A1* | 3/2016 | Bai | H04L 47/786 |
| | | | | 709/226 |
| 2016/0291972 | A1* | 10/2016 | Bryan | G06F 8/73 |
| 2016/0294559 | A1* | 10/2016 | Dabak | H04L 9/3247 |
| 2017/0039452 | A1* | 2/2017 | Osindero | G06F 16/50 |
| 2017/0104658 | A1* | 4/2017 | Sykes | H04L 41/064 |
| 2017/0195408 | A1* | 7/2017 | Wu | H04L 47/70 |
| 2018/0024901 | A1* | 1/2018 | Tankersley | G06Q 10/06393 |
| | | | | 707/694 |
| 2018/0181348 | A1* | 6/2018 | Kusters | G06F 3/0665 |
| 2018/0198680 | A1* | 7/2018 | Mladin | H04W 84/18 |
| 2018/0278498 | A1* | 9/2018 | Zeng | H04L 43/045 |
| 2018/0287907 | A1* | 10/2018 | Kulshreshtha | G06F 11/3495 |

OTHER PUBLICATIONS

Garg et al. ("Adaptive workflow scheduling in grid computing based on dynamic resource availability", Engineering Science and Technology, an International Journal 18 (2015) 256-269) (Year: 2015).*

Goyal et al. ("Probabilistic Modeling of Computer System Availability", Annals of Operations Research 8(1987)285-306) (Year: 1987).*

Wei et al. ("Dependability Modeling and Analysis for the Virtual Data Center of Cloud Computing", IEEE, 2011, pp. 784-789) (Year: 2011).*

ServiceNow, Inc.; "Service Mapping;" https://www.servicenow.com/products/service-mapping.html (last visited Jan. 4, 2019); 2018; 9 pages.

ServiceNow, Inc.; "Service Mapping, Data Sheet;" Nov. 2017; 2 pages.

ServiceNow, Inc.; "Event Management" https://www.servicenow.com/products/event-management.html (last visited Jan. 4, 2019); 2018; 7 pages.

ServiceNow, Inc.; "ServiceNow Event Management Data Sheet" Jul. 2018; 3 pages.

ServiceNow, Inc.; "Operational Intelligence;" https://www.servicenow.com/products/operational-intelligence.html (last visited Jan. 4, 2019); 2018; 9 pages.

ServiceNow, Inc.; "ServiceNow Operational Intelligence Data Sheet;" Jul. 2018; 2 pages.

McMahon, Jordan; "It automation and disaster recovery realities;" Automation as IT's best ally (/blog/automation-as-it-s-best-ally); Oct. 8, 2014; 5 pages.

IBM; "Watson IoT—IBM Predictive Maintenance and Optimization;" 2017; 2 pages.

Rice et al.; "Automation IT: Predictive maintenance embraces analytics;" InTech Magazine; Jan. 2013; 4 pages.

Device42 Software; "Application Dependency Mapping Software;" https://www.device42.com/features/application-mappings/ (last visited Jan. 4, 2019); 2019; 12 pages.

Cisco Systems; "Cisco Application Dependency Mapping Service;" Dec. 2017; 4 pages.

Uila, Inc.; "Application Dependency Mapping;" https://www.uila.com/solutions/application-dependency-mapping (last visited Jan. 4, 2019); 2019; 5 pages.

Dynatrace; "Automatically discover millions of dependencies in real time;" https://www.dynatrace.com/platform/artificial-intelligence/dependency-detection/ (last visited Jan. 4, 2019); published on or before Jan. 1, 2019; 5 pages.

* cited by examiner

Application Session Information Data Structure 305

| STR | PCode | CNT | SRC | DST | SCNT | ToA | ET | WGT | UWGT | DWGT |
|-----|-------|-----|-----|-----|------|-----|----|----|------|------|

Data Value   Description

STR:   Session track record
PCode: Priority code for application
CNT:   Session increments counter
SRC:   Source signature
DST:   Destination signature
SCNT:  Swap count; intermediate hops before reaching final DST.
ToA:   Time of arrival
ET:    Elapsed time
WGT:   Derived from PCode; Values: $0 < WGT \leq 1$.
UWGT:  Underlying weight. Probability rating for underlying infrastructure. Values: $0 < UWGT \leq 1$.
DWGT:  Differential weight calculated as WGT/UWGT

SYSTEM AND METHOD FOR DYNAMICALLY DETERMINING AVAILABILITY OF A COMPUTING RESOURCE

TECHNICAL FIELD

This application relates to systems and methods for dynamically determining availability of a computing resource and predicting an outage or loss of availability of a computing resource or software application.

BACKGROUND

In the wake of innovations such as cloud computing and virtualization, an organization's information technology ("IT") infrastructure and its relation to underlying applications consuming IT computing resources have become very complex. For example, an organization's IT infrastructure typically includes a diverse set of hardware components which are dependent on each other, with innumerable applications consuming these components. In many cases, a virtualization layer is created on top of the IT infrastructure, effectively obscuring the health of the underlying components from the applications consuming the resources they provide. Further, in addition being dependent on an organization's underlying IT computing resources, most applications typically have multi-layer and two-way dependencies with other applications. Accordingly, problems experienced by one application can often impact several upstream applications.

Due to these complexities, when an outage or "crisis" of the IT infrastructure occurs down at the component level, it is exceedingly difficult or even impossible to determine which infrastructure components are impacted. It is similarly difficult to then determine the full scope which applications are directly impacted by the outage of these affected infrastructure components, and which other applications are impacted based on one or more dependency relationships with other affected applications or infrastructure components.

SUMMARY

There is therefore a need for effective systems and methods for dynamically determining availability of a computing resource. In particular, there is a need for logic, tools and products that can holistically determine a radius of affected components and applications (e.g., "blast radius") when infrastructure components fail, and then take corrective or preventive actions to avoid impact to other components and applications dependent, directly or indirectly, on the failed component. There is also a need for effective systems and methods for determining the probability a particular computing resource is reliable and will be available for consumption.

The technology described herein provides several advantages over conventional technologies for complex IT crisis management. For example, the technology described herein reduces the resolution time required to determine the dependencies of computing resources and the applications that consume them. The disclosed technology also provides an improved scheme for prioritizing key computing resources and applications utilized within an organization.

Further, by virtue of its ability to map both infrastructure and application dependencies, the disclosed technology provides an improved method for predicting IT infrastructure failures, thereby enabling preventative actions to be taken prior to infrastructure and application outages. The disclosed technology also has the ability to identify patterns of undesirable behavior or inefficient operation by computing resources and applications based on analysis of logs, alerts and other activity indicators, and can therefore be used as a basis for infrastructure modifications to effect behavioral corrections.

In some aspects, the technology features a computer-implemented method for dynamically determining availability of a computing resource. A server computing device establishes an application session. The server computing device generates an application session data matrix comprising application session parameters. The application session parameters specify one or more aspects of the application session, an application associated with the application session, and a computing resource on which the application session depends. The server computing device derives a component signature block based on one or more application session parameters of the application session data matrix. The component signature block identifies the computing resource on which the application session depends and a total number of sessions dependent on the computing resource. The server computing device generates a metric signature block based on one or more application session parameters of the application session data matrix and the component signature block. The server computing device classifies the metric signature block according to one or more probability models, and derives a computing resource availability rating for the computing resource based on an output of the one or more probability models.

In some aspects, the technology features a system for dynamically determining availability of a computing resource. The system includes a server computing device having a memory for storing computer-executable instructions and a processor that executes the computer-executable instructions to establish an application session. The processor executes the computer-executable instructions to generate an application session data matrix comprising application session parameters. The application session parameters specify one or more aspects of the application session, an application associated with the application session, and a computing resource on which the application session depends. The processor executes the computer-executable instructions to derive a component signature block based on one or more application session parameters of the application session data matrix. The component signature block identifies the computing resource on which the application session depends and a total number of sessions dependent on the computing resource. The processor executes the computer-executable instructions to generate a metric signature block based on one or more application session parameters of the application session data matrix and the component signature block. The processor executes the computer-executable instructions to classify the metric signature block according to one or more probability models, and derive a computing resource availability rating for the computing resource based on an output of the one or more probability models Any of the above aspects can include one or more of the following features. In some embodiments, the application session data matrix is formatted according to an application session information schema. In some embodiments, the application session information schema includes one or more of an application session identifier, an application priority code, an application session volume indicator, a source computing resource signature block, a destination computing resource signature block, a swap count, a time of arrival, an elapsed time, a tunable weight value, an availability rating, and a differential weight calculation.

In some embodiments, classifying the metric signature block is further based on the component signature block, total number of application sessions dependent on the computing resource, an application session identifier, and a time of arrival associated with the application session. In some embodiments, classifying the metric signature block classifying the metric signature block further includes processing the metric signature block using one or more probability models constructed by naive Bayes techniques.

In some embodiments, the computing resource availability rating is further based on a tunable weight value and a differential weight value. In some embodiments, an alert is generated when the computing resource availability rating is below a first threshold value. In some embodiments, the application session is migrated to a second computing resource when the computing resource availability rating is below a first threshold value. In some embodiments, an access to the computing resource is determined based on an application priority rating when the computing resource availability rating is below a first threshold value. In some embodiments, the computing resource availability rating is derived for the computing resource upon establishment of a second application session.

BRIEF DESCRIPTION OF THE DRAWINGS

The advantages of the systems and methods described herein, together with further advantages, may be better understood by referring to the following description taken in conjunction with the accompanying drawings. The drawings are not necessarily to scale, emphasis instead generally being placed upon illustrating the principles of the described embodiments by way of example only.

DETAILED DESCRIPTION

Figure 1:
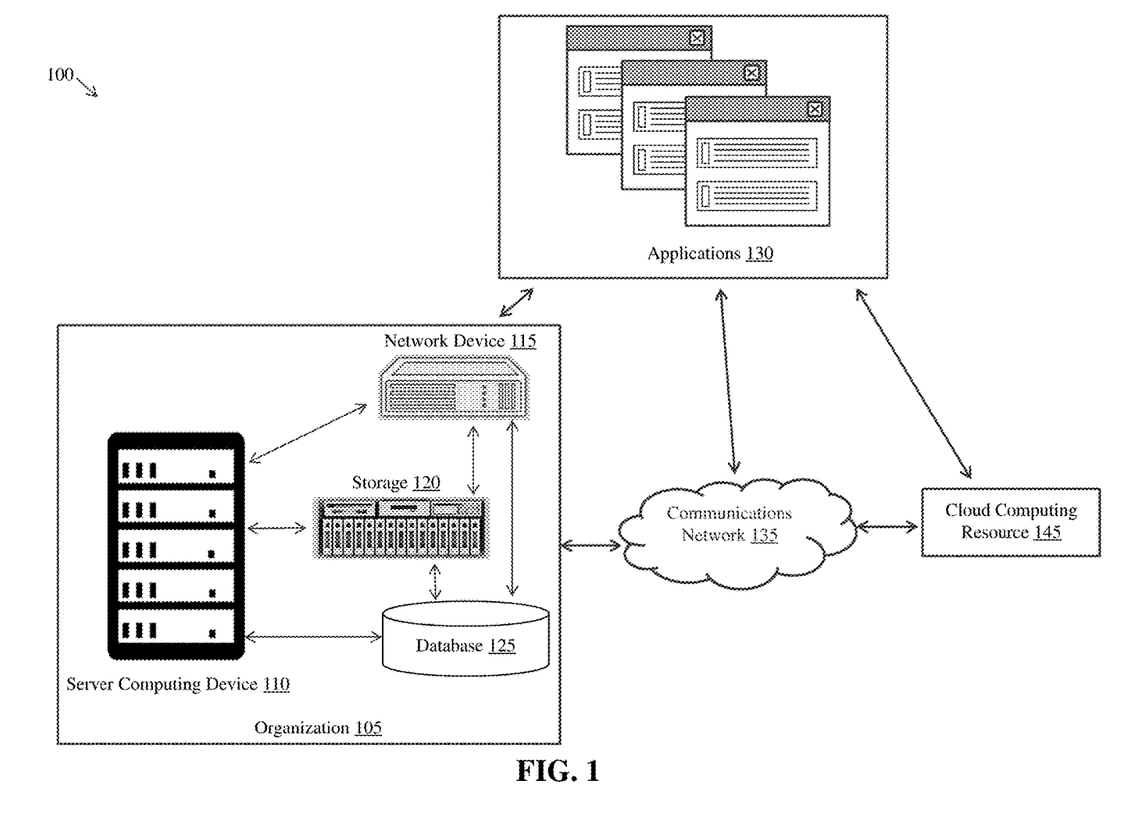
FIG. 1 is a block diagram of a computing environment for dynamically determining availability of a computing resource according to embodiments of the technology described herein.

FIG. 1 is a block diagram of a computing environment 100 for dynamically determining availability of a computing resource. Computing environment 100 includes user organization 105, applications 130, cloud computing resource 145, and communications network 135.

Organization 105 is a business entity in a particular industry (e.g., telecom, e-retail, Banking and Financial Services, entertainment, educational institution, etc.). However, organization 105 is not limited to being in any particular industry. For example, organization 105 can be any entity having an IT infrastructure including hardware components and software applications, with several interdependencies between them.

Organization 105 includes various facilities and IT infrastructure for conducting its business operations. For example, as shown in FIG. 1, organization 105 can include server computing device 110 (hereinafter "server 110"), network device 115, storage 120, and database 125. Server 110, network device 115, storage 120, and database 125 operate in tandem to implement the logic operations in accordance with the embodiments of the technology described herein. Although only a single instance of each of server 110, network device 115, storage 120, and database 125 are shown, it should be understood that each can represent a plurality of devices and databases, and can support connections to a variety of communications media types and protocols. Further, organization 105 can include multiple buildings or facilities, each having its own IT infrastructure for implementing some or all of the methods described herein. The methods implemented by this technology may be achieved by implementing program procedures, modules and/or software executed on, for example, a processor-based computing device or network of computing devices.

Server 110 is a computing device (or in some embodiments, a set or cluster of computing devices) that comprises a combination of hardware, including one or more processors and one or more physical memory modules, and specialized software engines and models that execute on the processor of server 110, to receive data from other components shown in computing environment 100, transmit data to other components of computing environment 100, and perform the functions described herein. In some embodiments, server 110 includes one or more of a cluster of server computing devices, a server computing device employing massively parallel computing algorithms, and a server computing device employing a plurality of processors. In some embodiments, server 110 includes one or more client computing devices used by employees or members of organization 105.

In some embodiments, server 110 includes specialized sets of computer software instructions programmed onto a dedicated processor in the server 110 and can include specifically-designated memory locations and/or registers for executing the specialized computer software instructions. Although server 110, network device 115, storage 120, and database 125 are depicted as being collocated in FIG. 1, in some embodiments the functionality of these components can be distributed among a plurality of server computing devices located at multiple physical locations. It should be appreciated that any number of computing devices, arranged in a variety of architectures, resources, and configurations (e.g., cluster computing, virtual computing, cloud computing) can be used without departing from the scope of the invention. The exemplary functionality of the technology is described in detail below.

Network device 115 represents one or more hardware and software components that facilitate internal communications between the various components of the IT infrastructure of organization 105, as well as communications with components external to organization 105 via communications network 135. In some embodiments, network device 115 includes one or more of a switch, a router, a hub, a bridge, a repeater and a gateway, and any ancillary equipment needed to interconnect the devices (e.g., Ethernet cabling, coaxial cabling, fiber optic cabling, network patch panels, Ethernet jacks, coaxial jacks, etc.).

Storage 120 represents one or more hardware and software components that facilitate storage and management of digital data operated on by the various components of the IT infrastructure of organization 105. In some embodiments, storage 120 includes one or more of a hard disk array, a flash disk array, magnetic tape data storage, a RAID controller, and a network-attached storage ("NAS") device. In some embodiments, storage 120 includes a storage area network ("SAN") made up of one or more SAN switches. In some examples, components of the SAN communicate using one more protocols including Fibre Channel, iSCSI, ATA over Ethernet ("AoE") and HyperSCSI. In some embodiments, storage 120 includes one or more network connections to a network internal to organization 105, a network external to organization 105, or both.

Database 125 is a computing device (or in some embodiments, a set of computing devices) that is in communication with server 110, network device 115, and storage 120, and is configured to receive, generate, and store specific segments of data relating to the operations described herein. For example, database 125 can manage and store data operated on by applications 130, and can also store data that is used to host services offered by organization 105, such as data that is used to populate UIs for web-hosted tools. In some embodiments, all or a portion of the database 125 can be integrated with the server 110 or be located on a separate computing device or devices. For example, the database 125 can comprise one or more databases, such as MySQL™ available from Oracle Corp. of Redwood City, Calif. In some embodiments, database 125 is a component of storage 120.

Applications 130 represents a plurality of applications executing on the various systems of computing environment 100. For example, applications 130 can include one or more of an operating system (e.g., real-time operating system ("RTOS"), batch operating system, distributed operating system, time-sharing operating system, network operating system, etc.), application software, a software driver, an application programming interface ("API"), and a data structure passed between applications.

Cloud computing resource 145 represents a network-accessible collection of computing resources configurable for implementing one or more services (e.g., big data analytics, Internet of Things ("IoT") applications, artificial intelligence, web and mobile app hosting, etc.). In some embodiments, cloud computing resource 145 includes cloud computing services provided by one or more of Amazon Web Services™, Google Cloud Platform™, Microsoft Azure™, IBM Bluemix™, and Alibaba Cloud™.

Communications network 135 can be a local network, such as a LAN, or a wide area network ("WAN"), such as the Internet and/or a cellular network. Communications network 135 can further comprise components of both a LAN and a WAN, or any other type of network known in the art. Communications network 135 facilitates communications between the IT infrastructure of organization 105, applications 130, and cloud computing resource 145. The various components of organization 105 and cloud computing resource 145 can include network-interface components to enable connectivity to communications network 135 via multiple mediums and network types. For example, the network-interface components can include components to connect to either of a wired network or a wireless network, such as a Wi-Fi or cellular network, in order to access a wider network, such as the Internet.

Several hardware and software dependency relationships can exist in a complex computing environment having an IT infrastructure made up of numerous types of hardware systems communicating with each other using disparate data communication protocols, and in many cases, executing different operating systems and/or software applications.

For example, a particular hardware computing resource can have dependencies on other hardware systems and components based on aspects such as the configuration of the computing resource (e.g., CPU speed, processing capabilities and typical utilization, volatile and non-volatile memory capacities and performance, bandwidth/throughput of network hardware, etc.), its physical location within computing environment 100, and the attributes of the connections (e.g., physical, network, etc.) that exist between the computing resource and the other hardware components of computing environment 100.

Software applications can have dependencies on other software applications based on, for example, the use of shared libraries among many applications, and in such scenarios where a first application takes its input from the output of a second application that must complete execution before the first application can proceed.

Software applications can also have certain dependencies on hardware computing resources. For example, an application can impose certain minimum requirements on the capabilities of the underlying hardware components (e.g., CPU speed, volatile memory size, amount of free non-volatile storage space, file system type, etc.) that must be available in order for it to execute. And, all hardware components are fundamentally dependent on software to prescribe how each component operates.

Figure 2:
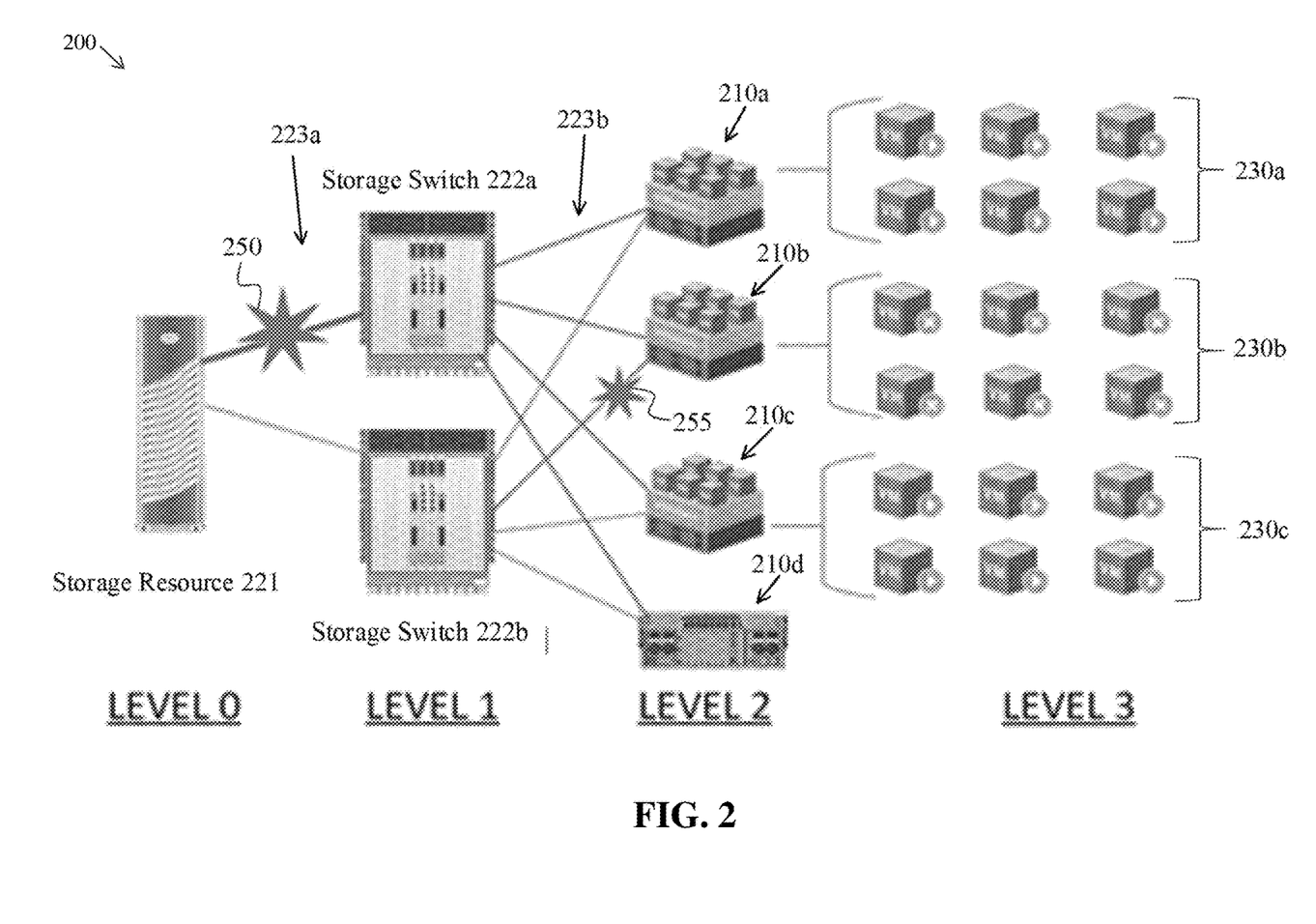
FIG. 2 is a block diagram showing a storage area network including various interconnected IT infrastructure components during an outage event according to embodiments of the technology described herein.

FIG. 2 is a block diagram of SAN 200 showing various interconnected IT infrastructure components during an outage event. In particular, FIG. 2 depicts a SAN connecting four server computing devices (e.g., server 210a, server 210b, server 210c, and server 210d, collectively "servers 210") to a storage resource (e.g., storage resource 221) via two SAN switches (e.g., storage switch 222a and storage switch 222b, collectively "storage switches 222"). The SAN fabric includes links 223 interconnecting the various hardware components or nodes of the SAN. Links 223a provide separate connections between storage resource 221 and each of the storage switches 222, and links 223b provide separate connections between each of the storage switches 222 and servers 210.

As shown in FIG. 2, server 210a, server 210b and server 210c each have applications executing on them: application 230a, application 230b, and application 230c, respectively (collectively, "applications 230"). For example, each of applications 230 can be a set of virtual machines, each running an instance of an operating system and executing various application software. In some embodiments, one or more virtual machine monitors or hypervisors running on each of the servers 210 create, manage, and monitor the virtual machines.

Storage resource 221 is a storage component such as a hard disk array, a flash disk array, magnetic tape data storage, and/or a network-attached storage ("NAS") device. Storage resource 221 provides the storage space needed for the various data being operated upon by applications 230.

Accordingly, it is evident that several dependency relationships exist amongst the components of SAN 200 and applications 230. As one example, application 230a is dependent on the hardware and virtualization software running on server 210a to manage its execution and perform I/O operations on its behalf to access the data being operated upon by the application. Server 210a is in turn dependent on SAN switches 222 to route data requests from server 210a to a storage resource containing the requested data, and SAN switches 222 are dependent on storage resource 221 to retrieve and provide the requested data.

Based on this example, it can be understood that a hierarchy exists within SAN 200 with respect to how severe the impact to the operations of SAN 200 would be based on a particular computing resource or application becoming unavailable (e.g., network connectivity or link issue) or non-operational (e.g., failure of the component). As shown in FIG. 2, the components of SAN 200 are divided into a hierarchy having four levels (e.g., level 0, level 1, level 2, and level 3).

Level 0 includes components for which the impact to the operations of SAN 200 would be the most severe in the event a computing resource or application at that level failed or became unavailable. As shown, storage resource 221 is SAN 200's only storage resource, and any event causing it to be unavailable or non-operational would impact the operation of every other component of SAN 200.

Level 1 is the next level of the hierarchy and includes storage switches 222. As shown in FIG. 2, each of storage switches 222 includes a link to storage resource 221 and all of servers 210. Accordingly, this redundancy provides some resiliency in the event one of storage switches 222 becomes unavailable or non-operational. For example, if storage resource 221 became inaccessible to storage switch 222a due to link outage 250, servers 210 would still have a path to the data stored on storage device 221 via storage switch 222b, albeit with diminished performance due to the increased demands on storage switch 222b. Likewise, if storage switch 222b became inaccessible to server 210b due to link outage 255, server 210b would still be able to send its data requests to storage switch 222a.

Servers 210 are at level 2 of the hierarchy. Failure of any one of servers 210 would cause an outage for the corresponding of applications 230, but the other of applications 230 would continue to operate and may even see an increase in performance with fewer consumers of computing resources competing for processing and I/O cycles.

Finally, applications 230 are at level 3 of the hierarchy. Failure of any one of six application instances of each of applications 230 would only impact the user of that particular application instance, but the other of applications 230 would continue to operate. In certain instances, an application or computing resources at level three of the hierarchy based on number of users or systems impacted nonetheless relates to a mission critical function of organization 105. As described in more detail below, the technology described herein provides a means of prioritizing such functions.

In some scenarios, it can be useful to understand the impact of multi-level failures. For example, it is conceivable that a plurality of links 223 could be routed through the same piece of network equipment (e.g., network device 115). Accordingly, an issue with that particular piece of network equipment could cause both link outage 250 and link outage 255 to occur at the same time. In this scenario, despite the redundancy of storage switches 222, server 210b no longer has a path to storage resource 221, causing an outage event for all of the operating systems and software applications of application 230b.

By understanding all of the hardware and software dependencies that exist between the components of an IT infrastructure and the software applications utilizing or consuming the IT infrastructure, the impact to each computing resource or application can be assessed. Conventional methods for determining IT infrastructure or application dependencies are typically limited to mapping dependencies between like components only, i.e., dependencies between computing resources only, or dependencies between software applications only.

Further, conventional methods are only able to determine dependencies based on a static snapshot in time of an IT infrastructure and any executing applications. For example, conventional methods periodically (e.g., hourly, daily, weekly, etc.) capture a snapshot including the status and interconnectivity of all of the components of an IT infrastructure and the applications consuming the computing resources of the IT infrastructure, and a static dependency map is constructed based on the snapshot at that moment in time.

However, a modern computing environment is ever-changing and integrates computing resources and applications from several disparate sources and locations including cloud computing resources external to an organization and not under its control. Further, with the prevalence of virtualization and stateless communication protocols, an application's residency with a particular hardware computing resource and any sessions it establishes for processing data are exceedingly transient in nature. Accordingly, the conventional approach of a static dependency mapping generated using a frequency-based discovery process can be adequate for determining dependencies for applications having well-defined API endpoints in environments where a single source of truth can be maintained, but is wholly inadequate to dynamically determine dependencies for the components of a computing environment, especially one including legacy systems and applications that do not have well-defined API endpoints from which dependency information can be ascertained.

Figure 3:
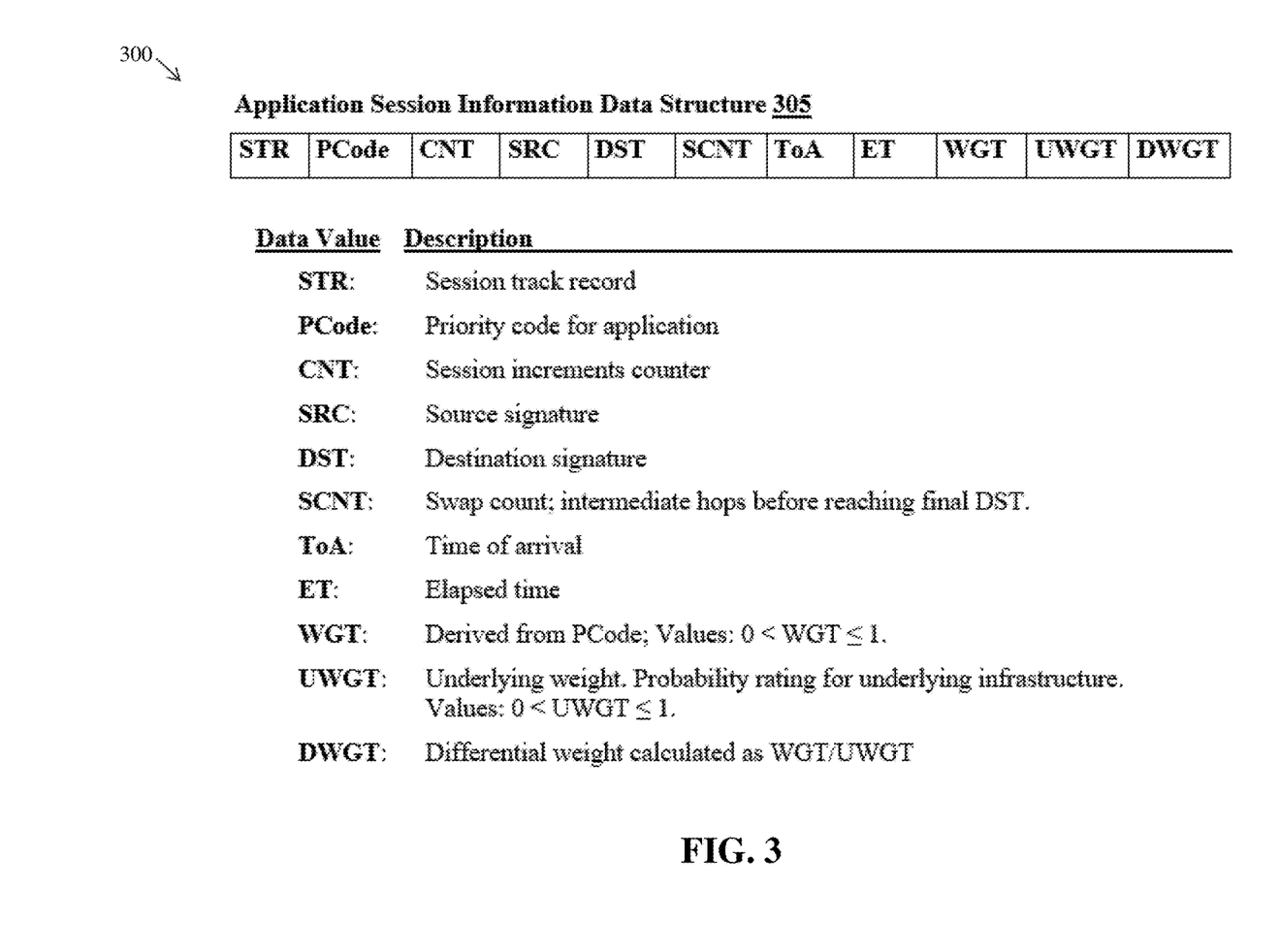
FIG. 3 is a diagram illustrating the organization of an application session information data structure according to embodiments of the technology described herein.

The technology described herein overcomes the deficiencies of conventional solutions, and provides systems and methods for dynamically determining availability of a computing resource and predicting an outage or loss of availability of a computing resource or software application. FIG. 3 is a diagram 300 illustrating the organization of an application session information data structure 305 (hereinafter "ASI 305") including fields or data values storing various information pertaining to aspects of an application session, an application associated with the application session, and a computing resource on which the session depends. Brief descriptions of the different data values of ASI 305 are shown in FIG. 3. The respective uses of the data values of ASI 305 for this technology will be described in connection with FIG. 4.

Figure 4:
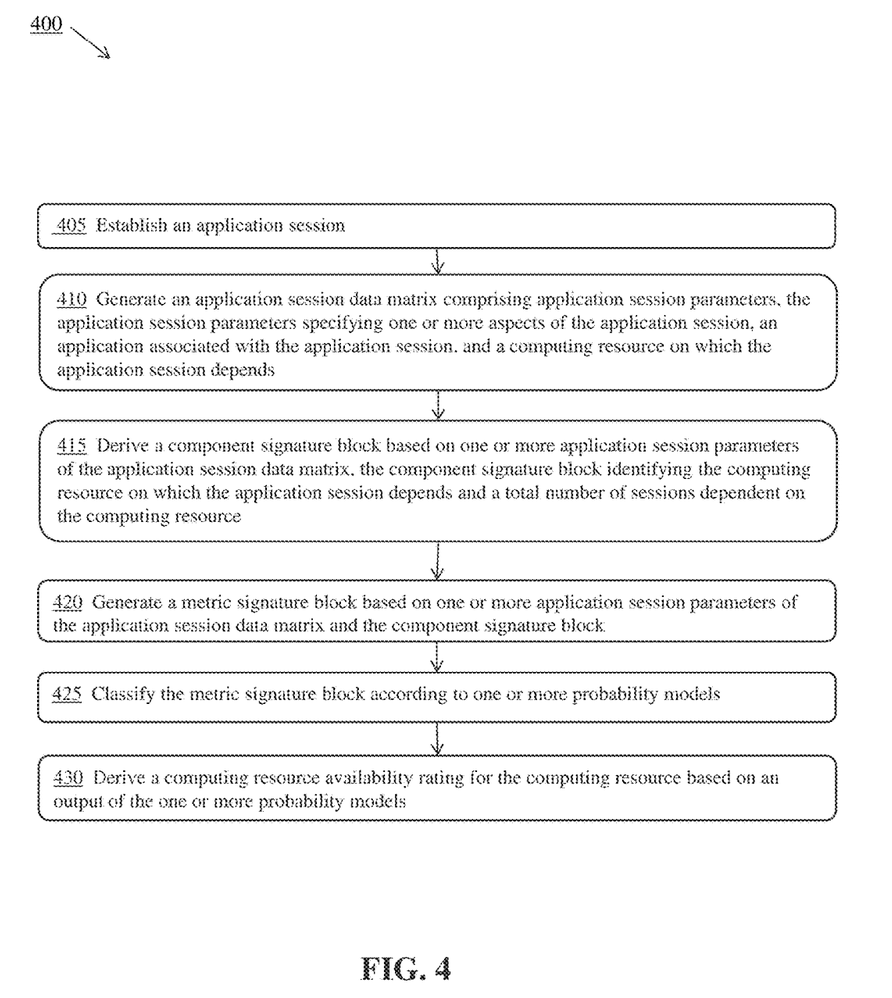
FIG. 4 a flow diagram of a computer-implemented method for dynamically determining availability of a computing resource according to embodiments of the technology described herein.

FIG. 4 shows a flow diagram of a computer-implemented method 400 for dynamically determining the availability of a computing resource. A server computing device establishes (405) an application session. Using the example described above in connection with FIG. 2, an application session can be established for requesting data for application 230a executing on server 210a.

The server computing device generates (410) an application session data matrix (e.g., ASI 305) comprising application session parameters. The application session parameters specify one or more aspects of the application session, an application associated with the application session, and a computing resource on which the application session depends. For example, an instance of ASI 305 can be generated for storing information pertaining to application 230a and the session that was established with a computing resource to access the data requested by application 230a. In some embodiments, the instance of ASI 305 is integrated into the source code of application 230a. In some embodiments, ASI 305 is formatted according to an application session information schema specifying information about each data value such as type (string, integer, etc.), field length, position within ASI 305, default value, etc.

The data vales of the generated instance of ASI 305 can be populated with information pertaining to application 230a and the session established with the computing resource to access the data requested by application 230a.

In some embodiments, the STR data value of ASI 305 is assigned a session track record or session ID for uniquely identifying its corresponding application and/or application session. In some embodiments, the STR data value is based on information about one or more of the underlying components of the IT infrastructure of organization 105 associated with, or utilized by, a particular session. For example, the STR data value can be based on information about one or more of a server (e.g., server 110), a client computing device, a local computing resource, a remote or cloud-based computing resource (e.g., cloud computing resource 145), a storage resource (e.g., storage 120), and a network on which data related to the session is communicated (e.g., communications networks 135).

In some embodiments, the PCode data value of ASI 305 is assigned a criticality rating of an application. For example, certain applications executing within computing environment 100 are considered "mission-critical" to the business operations of organization 105, and are assigned a PCode data value indicative of this status, while other less critical applications are assigned a PCode data value indicating a lower priority. In some embodiments, there are a range of values that can be assigned to PCode to indicate the priority of an application. Certain operations of the computing resources can be keyed off of the PCode data value, such as prioritizing the order that requests from applications are serviced according to PCode.

In some embodiments, the CNT data value is an indication of the volume of traffic at the computing resource indicated by the SRC data value. For example, the CNT data value can include a count of how many application sessions have been initiated with a particular computing resource at a given point in time.

In some embodiments, the SRC data value specifies the source computing resource from which the session was initiated, and the DST data value specifies the destination computing resource with which the session was established. In some embodiments, the DST data value indicates the last computing resource the session will consume in order to complete the requested operation. For example, if the last computing resource the session will consume is the same computing resource from which the session was initiated, the DST data value will be set equal to the SRC data value.

In some embodiments, the SRC and DST data values are updated based on which computing resource is processing the data. This advantageously enables the technology to dynamically map application sessions to particular computing resources of the IT infrastructure at the instant each interaction is happening, not based on a static snapshot of the application and infrastructure taken some period of time ago.

For example, SRC and DST can each refer to a computing resource associated with a server, web services, database operations, another application, or any endpoint of a client-server communication. In some embodiments, the SCNT data value identifies a number of intermediate hops or nodes between the SRC computing resource and the DST computing resource.

In some embodiments, the ToA data value stores an indication of a time when the application session was initiated with a computing resource. In some embodiments, the ET data value stores the elapsed time since the application session was initiated with the computing resource indicated by SRC. In some embodiments, the ET data value stores the total time taken by the application session from initiation with a computing resource until completion of the request. In some embodiments, the ET data value stores the average time taken by each computing resource or session during execution of an application.

In some embodiments, the WGT data value is a weight value between 0 and 1, and is derived from the PCode data value. For example, permissible values of the WGT data value can be expressed as $0<WGT\leq 1$. In some embodiments, the WGT data value is a tunable parameter derived from PCode, and also can be modified by organization 105 to accommodate changing requirements.

In some embodiments, the UWGT data value or "underlying weight" has a value between 0 and 1, and is derived as described below. For example, permissible values of the UWGT data value can be expressed as $0<UWGT\leq 1$. In some embodiments, the value of UWGT is a probability rating indicating the service availability of a particular computing resource that is determined as described below. In some embodiments, UWGT is a decoupled parameter that is calculated at the computing resource indicated by the SRC data value.

In some embodiments, the DWGT data value is a differential weight calculated based on WGT/UWGT. In some embodiments, congestion or issues at the computing resource corresponding to the SRC data value cause the value that is derived for UWGT to decrease or approach 0, causing a corresponding increase in the DWGT data value. In general, a DWGT data value close to but less than 1 is an indicator of reliable service by the corresponding computing resource. In some embodiments, assuming a value of WGT of 0.75, based on the performance of the underlying infrastructure, the value of DWGT should be at least 0.75 or higher to meet the service level agreement ("SLA") of organization 105.

The server computing device derives (415) a component signature block based on one or more application session parameters of the application session data matrix (e.g., ASI 305).

The component signature block identifies the computing resource on which the application session depends and a total number of sessions dependent on the computing resource. For example, the component signature block can identify computing resource associated with the DST data value of ASI 305 that the application has a dependency relationship with. The component signature block can also include a value indicating the number of applications that are dependent on that same computing resource. In this way, the component signature blocks derived from the parameters of several applications' application session information data structures can be used to build a dependency map showing cascaded dependency relationships based on the number of applications pointing to a particular computing resource.

In some embodiments, the component signature blocks derived from the parameters of several applications' application session information data structures are compared and a count value (e.g., CNT) for each applications' application session information data structure is incremented for each time there is a match in the DST data value, meaning that the application sessions are competing for the same resource. In this way, the technology is capable of dynamically determining dependencies and congestion points in the computing resources of computing environment 100.

The server computing device generates (420) a metric signature block based on one or more application session parameters of the application session data matrix and the component signature block. In some embodiments, the metric signature block is based on the values of one or more of STR, WGT, ToA, ET and CNT from ASI 305.

In some embodiments, a plurality of metric signature blocks are generated based on each component signature block. For example, for a particular component signature block associated with a computing resource utilized by an application session, different metric signature blocks can be generated based on several components and aspects of the computing resource, and each metric signature block can include data or information indicative of the reliability and/or performance of the particular component or aspect that was the basis for its generation.

By way of further example, for a component signature block, $CSB_{server}$, associated with a server utilized by a session, a plurality of metric signature blocks such as $MSB_{CPU}$, $MSB_{memory}$, etc. can be generated, while a plurality of metric signature blocks such as $MSB_{queue}$, $MSB_{response}$, etc. can be generated for a component signature block, $CSB_{storage}$, associated with a storage resource utilized by the session.

In some embodiments, a metric signature block includes fields or data values CSB, ERR, REQ, and TIME. The CSB data value identifies the component signature block for which the metric signature block was generated. In some embodiments, the CSB data value is based in part on the value of the STR data value from ASI 105. The ERR data value provides an indication of the number of errors that have occurred in connection with the component or aspect associated with a particular metric signature block. In some embodiments, the ERR data value is a count of the total number of errors that have occurred in connection with the component or aspect associated with a particular metric signature block. In some embodiments, the ERR data value includes information about the nature of the errors that have occurred and a severity rating associated with each error based on its impact on the business operations of organization 105.

The REQ data value provides an indication of the total number of requests that have been received by the corresponding component at a time indicated by the TIME data value. In some embodiments, the REQ data value indicates the total number of requests received that have not been serviced. In some embodiments, the REQ data value indicates the total number of requests received that have been serviced. In some embodiments, the REQ data value indicates a total of the number of requests received including both requests that have been serviced and requests that have not yet been serviced.

As discussed above, the UWGT data value can be a rating indicating the expected probability that a particular computing resource is in service and available. Calculation of the reliability probability at current time, $P_{RP,TC}$, for a particular component signature block, $CSB_k$, is determined based on the product of the reliability probability during ET, $P_{RP,ET}$, for $CSB_k$ and the reliability probability at ToA, $P_{RP,ToA}$, for $CSB_k$ as expressed in EQN. 1 below.

$$P_{RP,TC} = P_{RP,ET} * P_{RP,ToA} \quad \text{EQN. 1}$$

The reliability probability for $CSB_k$ for a particular time (e.g., ET, ToA, etc.), $P_{RP,T}$, can be determined as shown in EQN. 2 by computing the product of a plurality of quantities, $MSB_j$, that are each calculated for a respective metric signature block associated with $CSB_k$. Further, as shown in EQN. 3, each quantity $MSB_j$ depends on a proportion of errors (e.g., ERR data value) and requests (e.g., REQ data value) captured in the respective metric signature block. A very small constant $\beta$ is included in the calculation to ensure the resulting value of each $MSB_j$ lies between 0 and 1, but is considered negligible and does not otherwise influence the reliability probability determination.

$$P_{RP,T} = \prod_{j \in \{MSB1...n\}}^{n} MSB_j \quad \text{EQN. 2}$$

Where:

$$MSB_j = \left\{1 - \frac{ERRj}{Reqj} - \beta\right\}^2 \quad \text{EQN. 3}$$

The value of each $MSB_j$ keeps changing over time as the values of ERR and REQ in the respective metric signature block change. Accordingly, any calculation of reliability probability for a computing resource at a particular time requires a recalculation of the $MSB_j$ value for every metric signature block associated with a particular $CSB_k$, followed by computation of their product as in EQN. 2, and subsequently a determination of the product of the reliability probabilities as in EQN. 1. This can be processor-intensive for a complex component or resource having many metric signature blocks associated with it. The technology described herein therefore uses classification techniques to reduce the CPU cycles required for calculating reliability probability.

The server computing device classifies (425) the metric signature block according to one or more probability models. Classification can be used to select only $MSB_j$ values that, in the aggregate, can affect the reliability probability calculation for a particular of component signature block, and by extension, which component signature blocks will affect the UWGT data value.

For example, per EQN. 1, a reliability probability calculation for a particular $CSB_k$ includes $MSB_j$ quantities reflecting two states or times (e.g., ToA, ET), where each state depends on the proportion:

$$\frac{ERRj}{REQj}.$$

Accordingly, $MSB_j$ quantities can be thought of as having two states: $MSB_{j,ToA}$ at time ToA, and $MSB_{j,ET}$ for its average state during ET.

In some embodiments, the metric signature block is classified using one or more probability models constructed by naïve Bayes techniques. For example, models constructed using naïve Bayes techniques can be used to classify which cluster of $MSB_{(j \ldots n)}$ for a particular $CSB_k$ has a lower reliability probability and include only those $MSB_j$ values in the calculation. In this way, the technology filters out the bad candidates for reliability probability, and the load on the processor is reduced since values of $MSB_j$ that would not tend to affect the reliability probability calculation are not included. In some embodiments, classification of a cluster of $MSB_j$ values is based on historical data for that $MSB_j$ captured over a long period of time (e.g., hours, days, weeks, months, years, etc.). In some embodiments, one or more other conditional probability models or techniques are used in classification of the metric signature blocks (e.g., logit model and regression, linear classifier, averaged one-dependence estimator (AODE), etc.).

The server computing device derives (430) a computing resource availability rating for the computing resource based on an output of the one or more probability models. For example, based on the classification of the metric signature block, an updated value for the UWGT data value can be calculated. For example, EQN. 4 is an extrapolation of EQN. 1 for all component signature blocks associated based on their respective STR data value, at time ToA and during $ET_{AVG}$:

$$P_{UWGT,RP,TC,j \in \{CSB1\ldots n\}} = P_{UWGT,RP,ETavg,j \in \{CSB1\ldots n\}} * P_{UWGT,RP,ToA,j \in \{CSB1\ldots n\}} \qquad \text{EQN. 4}$$

Further, the reliability probability for a plurality of component signature blocks for a particular time (e.g., ET, ToA, etc.), $P_{UWGT,RP,T}$, can be determined as shown in EQN. 5 by computing the product of a plurality of quantities, $CSB_j$, that are each calculated for respective component signature blocks associated based on their respective STR data value.

$$P_{UWGT,RP,TC,j \in \{CSB1\ldots n\}} = P_{UWGT,RP,ETavg,j \in \{CSB1\ldots n\}} * P_{UWGT,RP,ToA,j \in \{CSB1\ldots n\}} \qquad \text{EQN. 4}$$

In some embodiments, the resulting value of UWGT is inversely proportional to the value of the ERR data values, and as the value of the ERR data values increases, reliability probability decreases. As described above, permissible values of the UWGT data value can be expressed as $0 < UWGT \leq 1$.

In some embodiments, upon calculation of an updated UWGT value, the server computing device generates an alert when the value of UWGT is below a first threshold value. In some embodiments, the application session is migrated to a second computing resource when the computing resource availability rating is below the first threshold value. In some embodiments, the server computing device does not calculate a value for UWGT until a second application session is initiated in computing environment 100.

Accordingly, the technology described herein generates dependency relationship information dynamically at the instant an application session is in process. Further, the technology is capable of dynamically determining congestion points in computing resources, and assessing their availability for consumption by an application. The technology described herein therefore overcomes the deficiencies of conventional solutions, and provides systems and methods for dynamically determining availability of a computing resource and predicting an outage or loss of availability of a computing resource or software application. For example, the technology operates within a computing environment to capture certain information about an application and its interacting environment at different times or stages (e.g., at execution start time, while application data and requests/responses are in transit, at completion of execution, etc.).

At each of these stages the application utilizes supporting providers or computing resources from the IT infrastructure including, but not limited to, servers (native or cloud instance), network, data storage, security, etc. These resources can each include a mechanism for capturing, reporting, and storing metrics for different constituting components. In some embodiments, these mechanisms are highly configurable and can capture, report, and store different metrics for a user defined period of time or in a customizable format.

In embodiments of the technology described herein, a metrics application can execute on each of server node through which an application interacts directly or indirectly. As described in detail herein, certain data values about an application and/or application session such as STR, WGT, ToA, ET, etc. can be captured and analyzed by the metrics application. The metrics application performs several computations and determinations, and feeds back a reliability probability rating to the application, which in turn updates an associated application session information data structure (e.g., ASI 105). The metrics application also updates a matrix of component signature blocks according to interactions with an application, and each component signature block includes a list of the applications which are dependent on it at a given time, even when multiple tiers of dependencies exist. For example, in the case where an application invokes one or more other applications during its execution, the associated STR data value is copied to each new session, effectively providing an index for identifying inter-application dependencies.

Accordingly, the described technology can dynamically create a dependency graph at any given point in time that accurately reflects all of the dependencies within a computing environment. Further, the metrics application captures, reports, and stores all of its information asynchronously with other nodes, and does not block execution of the applications it operates on.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

Variations, modifications, and other implementations of what is described herein will occur to those of ordinary skill in the art without departing from the spirit and the scope of the invention. Accordingly, the invention is not to be limited only to the preceding illustrative descriptions.

What is claimed is:

1. A computer-implemented method for dynamically determining availability of a computing resource, the method comprising:
  establishing, by a server computing device, an application session;
  generating, by the server computing device, an application session data matrix comprising application session parameters, the application session parameters specifying one or more aspects of the application session, an application associated with the application session, and a computing resource on which the application session depends;
  deriving, by the server computing device, a component signature block based on one or more application session parameters of the application session data matrix, the component signature block identifying the computing resource on which the application session depends and a total number of sessions dependent on the computing resource;
  generating, by the server computing device, a plurality of metric signature blocks, each of the plurality of metric signature blocks comprising data identifying the component signature block and information indicative of one or more of a reliability and a performance of a component of the computing resource on which the application session depends;

classifying, by the server computing device, the plurality of metric signature blocks into a cluster of metric signature blocks according to one or more probability models, the cluster of metric signature blocks being a subset of the plurality of metric signature blocks having values indicative of a low reliability; and deriving, by the server computing device, a computing resource availability rating for the computing resource based on the cluster of metric signature blocks.

2. The method of claim 1 further comprising formatting the application session data matrix according to an application session information schema.

3. The method of claim 2 wherein the application session information schema includes one or more of an application session identifier, an application priority code, an application session volume indicator, a source computing resource signature block, a destination computing resource signature block, a swap count, a time of arrival, an elapsed time, a tunable weight value, an availability rating, and a differential weight calculation.

4. The method of claim 1 wherein classifying is further based on the component signature block, total number of application sessions dependent on the computing resource, an application session identifier, and a time of arrival associated with the application session.

5. The method of claim 1 wherein classifying further comprises processing, by the server computing device, the plurality of metric signature block using one or more probability models constructed by naive Bayes techniques.

6. The method of claim 1 wherein the computing resource availability rating is further based on a tunable weight value and a differential weight value.

7. The method of claim 1 further comprising generating, by the server computing device, an alert when the computing resource availability rating is below a first threshold value.

8. The method of claim 1 further comprising migrating, by the server computing device, the application session to a second computing resource when the computing resource availability rating is below a first threshold value.

9. The method of claim 1 further comprising determining, by the server computing device, an access to the computing resource based on an application priority rating when the computing resource availability rating is below a first threshold value.

10. The method of claim 1 further comprising deriving, by the server computing device, the computing resource availability rating for the computing resource upon establishment of a second application session.

11. A system for dynamically determining availability of a computing resource, the system comprising:

a server computing device having a memory for storing computer-executable instructions and a processor that executes the computer-executable instructions to:

establish an application session;

generate an application session data matrix comprising application session parameters, the application session parameters specifying one or more aspects of the application session, an application associated with the application session, and a computing resource on which the application session depends;

derive a component signature block based on one or more application session parameters of the application session data matrix, the component signature block identifying the computing resource on which the application session depends and a total number of sessions dependent on the computing resource;

generate a plurality of metric signature blocks, each of the plurality of metric signature blocks comprising data identifying the component signature block and information indicative of one or more of a reliability and a performance of a component of the computing resource on which the application session depends;

classify the plurality of metric signature blocks into a cluster of metric signature blocks according to one or more probability models, the cluster of metric signature blocks being a subset of the plurality of metric signature blocks having values indicative of a low reliability; and derive a computing resource availability rating for the computing resource based on the cluster of metric signature blocks.

12. The system of claim 11 further comprising computer-executable instructions executed by the processor to format the application session data matrix according to an application session information schema.

13. The system of claim 12 wherein the application session information schema includes one or more of an application session identifier, an application priority code, an application session volume indicator, a source computing resource signature block, a destination computing resource signature block, a swap count, a time of arrival, an elapsed time, a tunable weight value, an availability rating, and a differential weight calculation.

14. The system of claim 11 wherein the computer-executable instructions executed by the processor further classify the metric signature block based on the component signature block, total number of application sessions dependent on the computing resource, an application session identifier, and a time of arrival associated with the application session.

15. The system of claim 11 further comprising computer-executable instructions executed by the processor to classify the plurality of metric signature block using one or more probability models constructed by naive Bayes techniques.

16. The system of claim 11 wherein the computing resource availability rating is further based on a tunable weight value and a differential weight value.

17. The system of claim 11 further comprising computer-executable instructions executed by the processor to generate an alert when the computing resource availability rating is below a first threshold value.

18. The system of claim 11 further comprising computer-executable instructions executed by the processor to migrate the application session to a second computing resource when the computing resource availability rating is below a first threshold value.

19. The system of claim 11 further comprising computer-executable instructions executed by the processor to determine an access to the computing resource based on an application priority rating when the computing resource availability rating is below a first threshold value.

20. The system of claim 11 further comprising computer-executable instructions executed by the processor to derive the computing resource availability rating for the computing resource upon establishment of a second application session.

* * * * *

UNITED STATES PATENT AND TRADEMARK OFFICE
CERTIFICATE OF CORRECTION

PATENT NO. : 10,467,360 B1
APPLICATION NO. : 16/238469
DATED : November 5, 2019
INVENTOR(S) : Gupta et al.

Page 1 of 1

It is certified that error appears in the above-identified patent and that said Letters Patent is hereby corrected as shown below:

In the Claims

Claim 5 (Column 17, Line 32), delete "block" and insert --blocks--

Claim 15 (Column 18, Line 42), delete "block" and insert --blocks--

Signed and Sealed this
Fifth Day of May, 2020

Andrei Iancu
*Director of the United States Patent and Trademark Office*